(12) United States Patent
Claesen

(10) Patent No.: US 12,636,584 B2
(45) Date of Patent: May 26, 2026

(54) SYSTEM, GAME CONSOLE AND METHOD FOR ADJUSTING A VIRTUAL ENVIRONMENT

(71) Applicant: Sony Group Corporation, Tokyo (JP)

(72) Inventor: Rik Claesen, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 280 days.

(21) Appl. No.: 17/797,112

(22) PCT Filed: Mar. 5, 2021

(86) PCT No.: PCT/EP2021/055584
§ 371 (c)(1),
(2) Date: Aug. 3, 2022

(87) PCT Pub. No.: WO2021/185600
PCT Pub. Date: Sep. 23, 2021

(65) Prior Publication Data
US 2023/0053767 A1 Feb. 23, 2023

(30) Foreign Application Priority Data

Mar. 20, 2020 (EP) ..................................... 20164559

(51) Int. Cl.
| | |
|---|---|
| *A63F 13/67* | (2014.01) |
| *A63F 13/212* | (2014.01) |
| *A63F 13/213* | (2014.01) |
| *A63F 13/215* | (2014.01) |
| *A63F 13/65* | (2014.01) |
| *A63F 13/87* | (2014.01) |

(52) U.S. Cl.
CPC ............ *A63F 13/67* (2014.09); *A63F 13/212* (2014.09); *A63F 13/213* (2014.09); *A63F*

*13/215* (2014.09); *A63F 13/65* (2014.09); *A63F 13/87* (2014.09); *A63F 2300/8082* (2013.01)

(58) Field of Classification Search
CPC ...... A63F 13/67; A63F 13/212; A63F 13/213; A63F 13/215; A63F 13/65; A63F 13/87; A63F 2300/8082; A63F 2300/5553
See application file for complete search history.

(56) References Cited

U.S. PATENT DOCUMENTS 5,974,262 A * 10/1999 Fuller .................... G06F 3/015
710/1
8,390,680 B2 3/2013 Perez et al.
(Continued)

OTHER PUBLICATIONS

International Search Report and Written Opinion mailed on Apr. 23, 2021, received for PCT Application PCT/EP2021/055584, filed on Mar. 5, 2021, 10 pages.

(Continued)

*Primary Examiner* — Carl V Larsen
(74) *Attorney, Agent, or Firm* — XSENSUS LLP

(57) ABSTRACT

A method for non-intrusively adjusting a virtual environment. The method comprises sensing a physical activity of a user perceiving the virtual environment and determining an emotional state of the user based on the sensed physical activity. Further, the method provides for adjusting the virtual environment using the user's emotional state as non-intrusive in-put by the user to increase and/or not to break the user's immersive experience of the virtual environment.

13 Claims, 4 Drawing Sheets

(56) References Cited

U.S. PATENT DOCUMENTS

| | | | | |
|---|---|---|---|---|
| 9,589,357 | B2 | 3/2017 | Li et al. | |
| 9,669,297 | B1* | 6/2017 | DeLaet | A63F 13/212 |
| 9,886,622 | B2 | 2/2018 | Du et al. | |
| 10,303,762 | B2* | 5/2019 | Markman | G06F 40/30 |
| 10,437,332 | B1* | 10/2019 | Paterson | G06F 40/166 |
| 2002/0022973 | A1* | 2/2002 | Sun | G16H 40/67 |
| | | | | 705/3 |
| 2007/0260984 | A1 | 11/2007 | Marks et al. | |
| 2011/0007142 | A1* | 1/2011 | Perez | A63F 13/213 |
| | | | | 348/E7.085 |
| 2011/0009193 | A1* | 1/2011 | Bond | A63F 13/65 |
| | | | | 463/36 |
| 2012/0194648 | A1* | 8/2012 | Hofshi | A63F 13/67 |
| | | | | 348/46 |
| 2014/0121017 | A1* | 5/2014 | Mandryk | A63F 13/212 |
| | | | | 463/36 |
| 2014/0223462 | A1* | 8/2014 | Aimone | G16Z 99/00 |
| | | | | 725/10 |
| 2014/0316192 | A1* | 10/2014 | de Zambotti | A61B 5/486 |
| | | | | 600/27 |
| 2016/0014257 | A1* | 1/2016 | He | H04W 68/005 |
| | | | | 455/414.1 |
| 2017/0041264 | A1* | 2/2017 | Khomami Abadi | A61B 5/165 |
| 2017/0045942 | A1* | 2/2017 | Bostick | G06F 3/015 |
| 2018/0024626 | A1* | 1/2018 | Sanger | G06V 40/175 |
| | | | | 463/13 |
| 2018/0165863 | A1* | 6/2018 | Kubo | A63F 13/25 |
| 2019/0015751 | A1* | 1/2019 | Kahn, II | A63F 13/67 |
| 2019/0099660 | A1* | 4/2019 | Nelson | A63F 3/00157 |
| 2019/0151764 | A1* | 5/2019 | Chen | A63F 13/30 |
| 2019/0343382 | A1* | 11/2019 | Rubner | G06F 3/0481 |
| 2019/0388785 | A1* | 12/2019 | Kumar | G10L 15/1815 |
| 2020/0178012 | A1* | 6/2020 | Fletcher | A61F 11/08 |
| 2020/0206631 | A1* | 7/2020 | Sumant | A63F 13/55 |
| 2020/0274837 | A1* | 8/2020 | Hildebrand | H04L 51/52 |
| 2020/0296480 | A1* | 9/2020 | Chappell, III | A61B 5/165 |
| 2020/0380882 | A1* | 12/2020 | Alailima | A61B 5/4836 |
| 2020/0388387 | A1* | 12/2020 | Rebolledo Mendez | |
| | | | | H04L 67/12 |
| 2021/0401339 | A1* | 12/2021 | Farber | G06F 3/013 |
| 2022/0224963 | A1* | 7/2022 | Herz | G06Q 30/0269 |
| 2023/0166178 | A1* | 6/2023 | Cheng | A63F 13/53 |
| | | | | 463/31 |
| 2024/0335738 | A1* | 10/2024 | Lake-Schaal | A63F 13/795 |

OTHER PUBLICATIONS

Iozzio, "An App That Captures Emotions In Real Time", smithsonian. com, Available Online At: https://www.smithsonianmag.com/innovation/app-captures-emotions-real-time-180951878/, Jun. 27, 2014, pp. 1-2.

Carron, "Software enables avatar to reproduce our emotions in real time", Available Online At: https://phys.org/news/2012-11-software-enables-avatar-emotions-real.html, Nov. 19, 2012, pp. 1-3.

* cited by examiner

100

110 Sensing a physical activity of a user perceiving a virtual environment.

120 Determining an emotional state of the user based on the sensed physical activity.

130 Adjusting the virtual environment using the user´s emotional state as non-intrusive input by the user to increase and/or not to break the user´s immersive experience of the virtual environment.

SYSTEM, GAME CONSOLE AND METHOD FOR ADJUSTING A VIRTUAL ENVIRONMENT

CROSS-REFERENCE TO RELATED APPLICATIONS

The present application is based on PCT filing PCT/EP2021/055584, filed Mar. 5, 2021, which claims priority to EP 20164559.5, filed Mar. 20, 2020, the entire contents of each are incorporated herein by reference.

FIELD

Embodiments of the present disclosure relate to a system, a game console and a method for adjusting a virtual environment. More specifically, the embodiments relate to a method for adjusting the virtual environment based on an emotional state of a user perceiving the virtual environment.

BACKGROUND

Users perceiving a virtual environment appreciate more and more an immersive experience of the virtual environment. In this context, immersion, or immersive experience, is a perception of being physically present in a virtual world represented by the virtual environment. In virtual reality applications, for example, the virtual environment represents a (virtual) first-person view of the user within a virtual world.

User feedback or user input to a system controlling the virtual environment via key input may reduce or "break" the immersive experience. In established concepts, this feedback or input is mandatory for the system to control the virtual environment.

Current concepts already provide immersive experiences to their users which may not require a user input, but without user input or feedback these immersive experiences would be reduced to, for example, scripted scenarios of the virtual environment.

SUMMARY

Hence, there may be a demand for a concept providing a non-intrusive adaption of a user's virtual environment.

This demand can be satisfied by the appended independent and dependent claims.

According to a first aspect, the present disclosure relates to a method for non-intrusively adjusting a virtual environment. The method comprises sensing a physical activity of a user perceiving the virtual environment and determining an emotional state of the user based on the sensed physical activity. Further, the method provides for adjusting the virtual environment using the user's emotional state as non-intrusive in-put by the user to increase and/or not to break the user's immersive experience of the virtual environment.

The virtual environment particularly can be understood as a virtual setting which the user can perceive visually and/or acoustically and which suggests to the user an alternative environment of the user which is at least partly fictional. The virtual environment, for example, is a virtual, augmented or a mixed reality represented by an output medium such as a screen, virtual reality glasses, speakers and/or a multimedia system.

The virtual environment can also refer to a virtual setting seen from an "ego-perspective" or to a surrounding of a visual representation of the user.

The physical activity of the user, for example, refers to facial expressions, vital functions (e.g. heart rate, blood pressure), body functions (e.g. perspiration), noises (e.g. verbal utterances, exclamations) or motions/gestures of the user. The physical activity of the user can be monitored using one or more sensors. The sensors, for example, comprise a camera for monitoring the facial expressions or gestures of the user. Additionally or alternatively, the sensors can comprise a heart rate monitor, a sphygmomanometer, a microphone, an eye tracking device and/or a moisture sensor for monitoring a perspiration of the user.

The emotional state can refer to feelings or emotions of the user. The physical activity of the user can reflect the user's emotional state, just as smile can express happiness of the user. In contrast, frantic gestures, a distressed facial expression, an increased blood pressure, heart rate, perspiration and/or pupil width may reflect stress and/or anger.

Thus, the emotional state of the user can be derived using the user's physical activity. For this, the sensors can provide activity data indicative of the user's physical activity to a data processing circuitry configured to infer on the user's emotional state from the activity data.

Depending on the sensors used for sensing the user's physical activity, the activity data can comprise image data (e.g. images), a sound spectrum, an electrocardiogram and/or records of the perspiration and/or the pupil width.

In order to determine the emotional state from the image data of the user, the data processing circuitry, for example, uses machine gesture and/or face recognition. In this way, the data processing circuitry, for example, determines the emotional state from gestures and/or facial expressions of the user.

The data processing circuitry can be further suitable for adjusting the virtual environment using the user's emotional state. To this end, the data processing circuitry can be coupled to the output medium providing the virtual environment to the user.

In this way, the data processing circuitry can control an influence of the virtual environment on the user's emotional state. The data processing circuitry, for example, may change an appearance or a content of the virtual environment to change the user's emotional state from "stressed" to "relaxed". For this, the virtual environment can change from reflecting a stressful scenario, in which the user, for example, needs to react as fast as possible, to a relaxing scenario in which no or less (stressful) interaction of the user is required.

This allows adjustments of the virtual environment in a "natural", non-intrusive way without any "immersion breaking" input instructions by the user which may reduce or "break" the immersive experience of the user.

According to a second aspect, the present disclosure relates to a computer program comprising instructions, which, when the computer program is executed by a processor, cause to processor to carry out the aforementioned method.

According to a third aspect, the present disclosure relates to a system for non-intrusively adjusting a virtual environment. The system comprises one or more sensors configured to sense a physical activity of a user perceiving a virtual environment and a data processing circuitry. The data processing circuitry is configured to determine an emotional state of the user based on the sensed physical activity. Further, the data processing circuitry is configured to adjust the virtual environment using the user's emotional state as non-intrusive input by the user to increase and/or not to break the user's immersive experience of the virtual environment.

According to a fourth aspect, the present disclosure relates to a game console configured to generate a virtual environment, wherein the game console comprises the aforementioned system for adjusting the virtual environment using an emotional state of a user perceiving the virtual environment as non-intrusive input by the user to increase and/or not to break the user's immersive experience of the virtual environment.

The above system and the above game console may especially be implemented for executing the above method. Therefore, features mentioned in connection with the above method can therefore be applied to the system and the game console by analogy.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
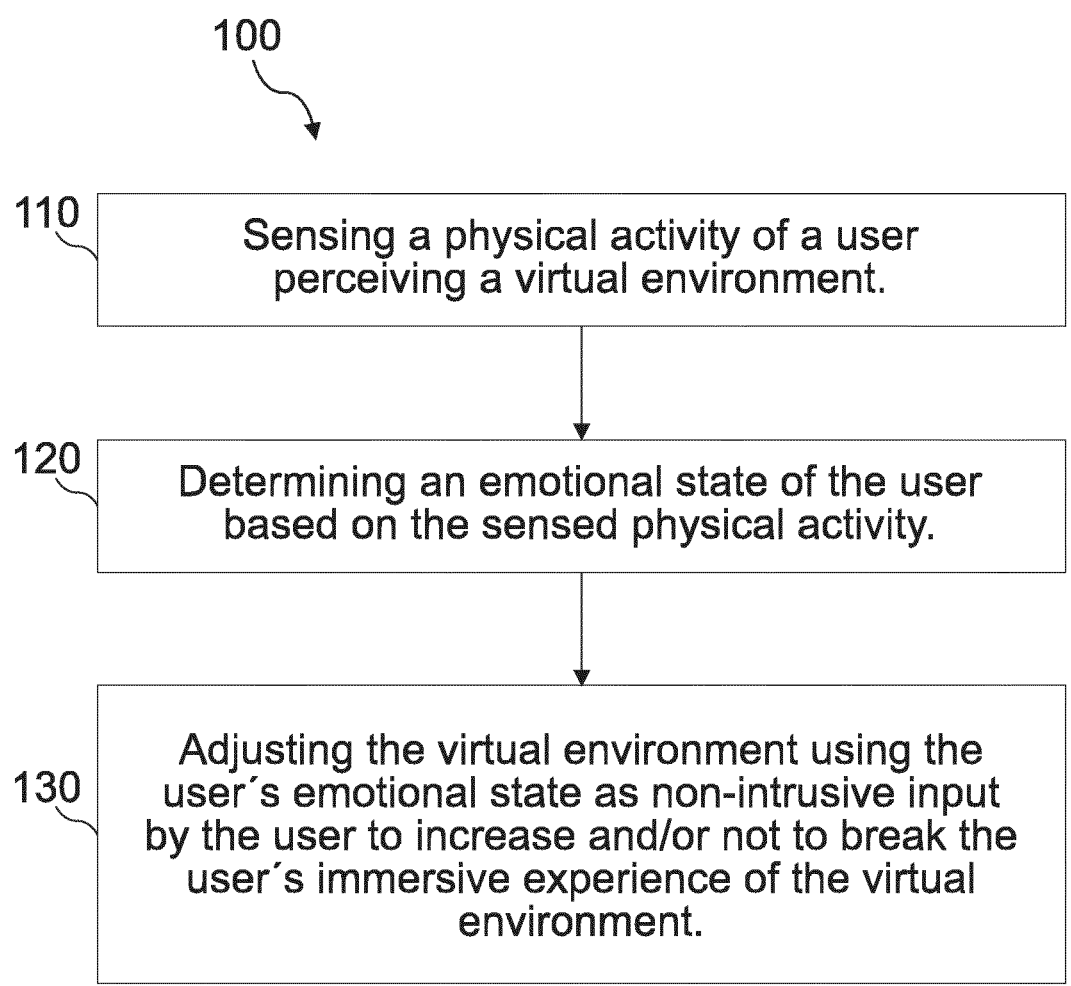
FIG. 1 shows a flow chart schematically illustrating a method for non-intrusively adjusting a virtual environment.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Some applications for purposes of entertainment or gaming suggest a virtual environment to a user to provide an immersive experience. In established applications, an influence of the user on the virtual environment is limited to conscious input instructions, for example, by pushing one or more buttons. Those input instructions can reduce an intensity of the immersive experience.

Hence, there may be a demand for a concept providing a non-intrusive adaption of a user's virtual environment.

FIG. 1 shows a flow chart schematically illustrating a method 100 for non-intrusively adjusting a virtual environment. The method 100 comprises sensing 110 a physical activity of a user perceiving the virtual environment and determining 120 an emotional state of the user based on the sensed physical activity. Further, the method 100 comprises adjusting 130 the virtual environment using the user's emotional state as non-intrusive input by the user to increase and/or not to break the user's immersive experience of the virtual environment.

In this way, a user's influence on the virtual environment does not depend solely on input instructions/commands (e.g. key commands) but at least partly on the user's emotional state. This can make the user feel that the virtual environment acts and reacts in similar manner as the real world does.

In other words, the above method can cause experiences of the virtual environment to appear lifelike because the user's influence on the virtual environment may feel natural and non-intrusive. The method may also allow for a customized dynamic gameplay which appears more naturally than if only the user's actions or instructions are taken as input.

The above method further enables users, which are not able to provide a specific input in the form of text or key commands, to interact with the virtual environment. Hence, for example, disabled people, children or illiterate persons can interact with the virtual environment through their emotional state.

In the following, the method 100 should be stated in more detail by reference to some technical implementations of the method 100. Features stated in connection with the technical implementations should therefore be understood as features which can be applied analogously to the process.

Figure 2A:
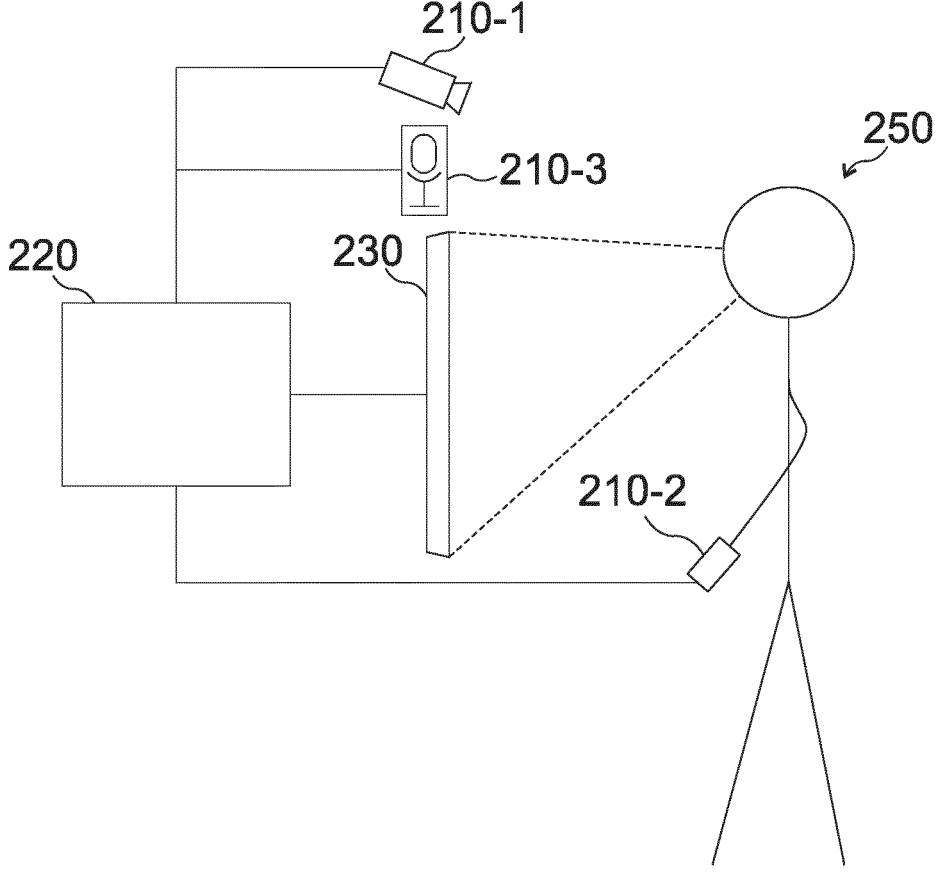
FIG. 2a illustrates an embodiment of a system for non-intrusively adjusting the virtual environment.

FIG. 2a illustrates an embodiment of a system suitable for executing the above method 100.

The system comprises multiple sensors 210-1, 210-2 and 210-3 configured to sense a physical activity of a user 250 perceiving the virtual environment which is displayed on a screen 230. The screen 230, for example, is a display of a mobile phone (e.g. a smartphone), a computer monitor or a television (TV) screen, a head mounted display (hmd) providing the virtual environment to a user 250.

Sensor 210-1 is, for instance, a camera which is configured to provide images of the user 250, sensor 210-2 can be body sensor for recording body functions (e.g. sweating/ perspiration) or vital functions (e.g. heart rate, blood pressure) of the user 250 and sensor 210-3 is a microphone for recording noises like verbal utterances or exclamations from the user 250.

Sensor 210-2, for example, is a heart rate monitor implemented in a wearable or a video game controller of the user 250.

The sensors 210-1, 210-2 and 210-3 are connected to a data processing circuitry 220 of the system to provide the data processing circuitry 220 with the user's physical activity in the form of images and records of the user's body functions, vital functions and of the noises from the user 250.

The sensors 210-1, 210-2 and 210-3 can be wired or wirelessly coupled to the data processing circuitry 220.

The data processing circuitry 220 can determine an emotional state of the user 250 based on the sensed physical activity in order to adjust the virtual environment using the user's emotional state as non-intrusive input by the user 250 to increase and/or not to break the user's immersive experience of the virtual environment.

To this end, the data processing circuitry 220 may determine the emotional state from the images of the user 250 using, for example, face and/or gesture recognition. For this, the data processing circuitry 220 can run a computer program for face and/or gesture recognition.

Monitoring or tracking the physical activity can provide a real-time assessment of the emotional state, allowing real-time adjustments to the virtual environment.

The system can be installed/implemented in a game console, a mobile phone (e.g. a smartphone), a tablet, a multimedia system, a head mounted display (hmd) or a TV. Hence, the data processing circuitry 220 can be configured as a processor of such a game console which can computationally generate, control and modify/adjust the virtual environment.

Alternatively, the data processing circuitry 220 can be a supplementary processor separate from the processor intended for generating, controlling and modifying/adjusting the virtual environment.

Figure 2B:
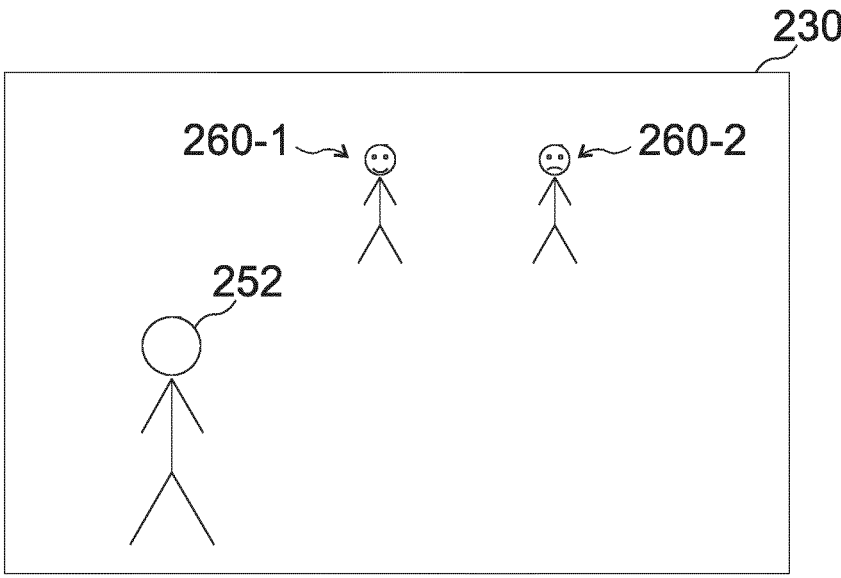
FIG. 2b illustrates a first example of the virtual environment.

As can be seen in FIG. 2b, the virtual environment displayed on the screen 230, for example, includes one or more non-player characters (NPCs) 260-1 and 260-2 which can interact with the user 250 or its avatar 252 which is surrounded by the virtual environment. The avatar 252 can be understood as a (virtual) visual representation of the user 250.

In order to keep up or preserve the immersive experience of the user 250, the NPCs 260-1 and 260-2 can interact differently with the avatar 252 depending on the emotional state of the user 250. The NPCs 260-1 and/or 260-2, for example, can act kindly if the user 250 is calm. Otherwise, if the user 250, for example, is upset, the NPCs 260-1 and 260-2 can act rude or disrespectful.

In this way, the influence of the user 250 on the NPCs 260-1 and 260-2 feels more realistic than an interaction of the user 250 with the NPCs 260-1 and 260-2 via intrusive input instructions. Thus, this way of influence of the user 250 can preserve the immersive experience. The NPCs 260-1 and 260-2, for example, can be virtual opponents of the user 250 in a video game.

In video games, the virtual environment can be affected by a gameplay of the video game. In this context, gameplay, for example, refers to a specific way in which the user 250 interacts with the video game and vice versa. Gameplay can be also understood as a pattern defined through game rules, a connection between the user 250 and the video game, challenges and overcoming them, a plot and the user's connection with it.

Hence, the gameplay, for example, defines how the user 250 can interact with objects of the virtual environment. Thus, in video games the data processing circuitry 220 can adjust the virtual environment 220 by adjusting the gameplay of the video game.

The gameplay can also specify an appearance of the non-player characters 260-1 and 260-2. Hence, adjustments of the virtual environment can also include an adjustment of the appearance of the NPCs 260-1 and 260-2.

In context of the present disclosure, the appearance of the NPCs 260-1 and 260-2 can refer to a visual representation or a look of the NPCs 260-1 and 260-2 but also to a number or a frequency with which the NPCs 260-1 and 260-2 may occur. Thus, in order to adjust the virtual environment based on the emotional state of the user 250, the data processing circuitry 220, for example, changes the look of the NPCs 260-1 and 260-2 or the frequency of their occurrence.

The system can also check an influence of the NPCs 260-1 and 260-2 on the user's emotional state to adjust the appearance of the NPCs 260-1 and 260-2 specifically to the user's emotional state. The system, for example, detects that the appearance of NPC 260-1 makes the user 250 happy, whereas the appearance of NPC 260-2 scares the user 250. Subsequently, the data processing circuitry 220 can make the NPC 260-1 to appear more frequently than before to make the user 250 happy. For the same purpose, the data processing circuitry 220 can change the look of the NPC 260-2 to lower its scare effect on the user 250.

The gameplay can further specify a difficulty level of the video game. The difficulty level can refer to a difficulty for the user 250 to overcome challenges or tasks of the video game. The data processing circuitry 220 can further adjust the difficulty level of the video game based on the user's emotional state.

The user 250, for example, may be not able to overcome one or more challenges of the video game as a current difficulty level is too high and thus, the user 250 can be frustrated. Once, the system detected frustration of the user 250, the data processing circuitry 220, for example, can lower the difficulty level of the video game to reduce the user's frustration. Vice versa, the data processing circuitry 220 can raise the difficulty level if the system detects that the user 250 is bored while playing the video game.

Figure 2C:
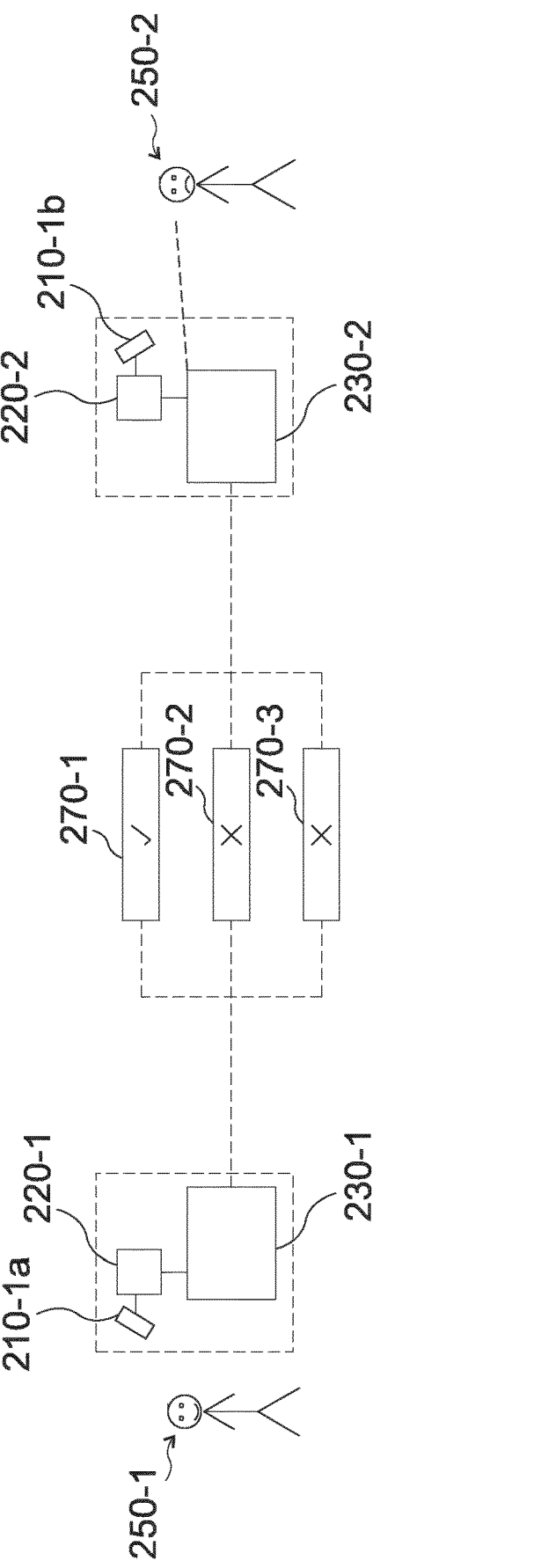
FIG. 2c illustrates a second example of the virtual environment.

FIG. 2c illustrates a scenario in which the virtual environment provides an electronic communication between remote users 250-1 and 250-2. In this context, the virtual environment can be understood as a (graphical) user interface of the users 250-1 and 250-2 which enables the electronic communication. Options of the electronic communication can allow text communication 270-1, voice communication 270-2 and/or video/visual communication 270-3.

The users 250-1 and 250-2, for example, communicate via separate interconnected devices which are equipped with an embodiment of the aforementioned system including a camera 210-1a or 210-1b, a data processing circuitry 220-1 or 220-2 and a screen 230-1 or 230-2, respectively.

Each of the data processing circuities 220-1 and 220-2 can determine the emotional state of the (first) user 250-1 and the (second) user 250-2, respectively, from the images recorded by the (first) camera 210-1a and the (second) camera 210-1b, respectively. In this way, the devices can determine an influence of the electronic communication on the users 250-1 and 250-2, in order to adjust the virtual environment of the users 250-1 and 250-2 by adjusting the options 270-1, 270-2 and 270-3 of the electronic communication.

In FIG. 2c, for example, the device of the second user detects that the second user 250-2 is annoyed because of the electronic communication with the first user 250-1. Because of this the electronic communication between the users 250-1 and 250-2 may be restricted to text communication 270-1, whereas voice communication 270-2 and video/visual communication 270-3 is disabled.

Adjustments of the virtual environment can also reinforce the user's emotional state. This may cause unwanted feedback loops like a "fear enforced feedback loop" or an addictive effect.

To counteract this, the system can be also used for detecting a reinforcement of the user's emotional state by tracking the user's emotional state and adjusting the virtual environment based on the tracking of the user's emotional state to reduce the reinforcement of the user's emotional state.

In some game consoles, the system, for example, switches off the game console if the system detects a reinforcement of the user's emotional state over a predefined period of time.

The following examples pertain to further embodiments:

(1) A method for non-intrusively adjusting a virtual environment, comprising:
  sensing a physical activity of a user perceiving the virtual environment;
  determining an emotional state of the user based on the sensed physical activity; and
  adjusting the virtual environment using the user's emotional state as non-intrusive input by the user to increase and/or not to break the user's immersive experience of the virtual environment.

(2) Method of (1),
  wherein the virtual environment surrounds a visual representation of the user; and
  wherein the method further comprises adjusting the user's visual representation based on the user's emotional state.

(3) Method of (1) or (2), wherein the user's physical activity comprises at least one of motions, body functions, a facial expression and a sound generated by the user.

(4) Method of any one of (1) to (3),
  wherein the virtual environment is affected by a gameplay of a video game; and
  wherein adjusting the virtual environment comprises adjusting the gameplay.

(5) Method of (4),
  wherein the gameplay specifies an appearance of one or more non-player characters (NPCs) of the video game; and
  wherein adjusting the gameplay comprises adapting the appearance of the one or more NPCs based on the user's emotional state.

(6) Method of (4) or (5),
  wherein the gameplay specifies a difficulty level of the video game; and
  wherein adjusting the gameplay comprises adapting the difficulty level of the video game based on the user's emotional state.

(7) Method of any one of (1) to (6),
  wherein the virtual environment provides an electronic communication between the user and one or more remote users; and wherein adjusting the virtual environment comprises changing options of the electronic communication between the user and the one or more remote users.

(8) Method of any one of (1) to (7), wherein the virtual environment comprises a virtual reality, an augmented reality or a mixed reality.

(9) Method of any one of (1) to (8), further comprising:
  detecting a reinforcement of the user's emotional state by tracking the user's emotional state; and
  adjusting the virtual environment based on the tracking of the user's emotional state to reduce the reinforcement of the user's emotional state.

(10) A computer program comprising instructions, which, when the computer program is executed by a processor, cause to processor to carry out the method of any one of (1) to (9).

(11) A system for non-intrusively adjusting a virtual environment, comprising:
  one or more sensors configured to sense a physical activity of a user perceiving a virtual environment; and
  a data processing circuitry configured to:
    determine an emotional state of the user based on the sensed physical activity; and
    adjust the virtual environment using the user's emotional state as non-intrusive input by the user to increase and/or not to break the user's immersive experience of the virtual environment.

(12) System of (11),
  wherein the sensors comprise a camera configured to provide one or more images reflecting the physical activity of the user; and
  wherein the data processing circuitry is configured to determine the emotional state of the user based on the images of the user.

(13) System of (11) or (12),
  wherein the sensors are configured to sense at least one of a heart rate, a blood pressure, a pupil size and/or a sweating of the user; and
  wherein the data processing circuitry is configured to determine the emotional state of the user based on one of the heart rate, a blood pressure, a pupil size and a sweating of the user.

(14) A game console configured to generate a virtual environment, wherein the game console comprises a system of any one of (11) to (13) for adjusting the virtual environment using an emotional state of a user perceiving the virtual environment as non-intrusive input by the user to increase and/or not to break the user's immersive experience of the virtual environment.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . ." performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively.

Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A method for adjusting a virtual environment of a virtual reality, comprising:
   sensing, by one or more sensors, a physical activity of a user perceiving the virtual environment in the virtual reality, wherein sensing the physical activity includes sensing at least one of heart rate, blood pressure, pupil size, and sweat;
   determining an emotional state of the user based on one or more of the heart rate, the blood pressure, the pupil size, and the sweat of the user;
   adjusting the virtual environment in the virtual reality based on the user's emotional state, wherein the virtual environment is a setting surrounding a visual representation of the user;
   tracking changes in the user's emotional state in response to the adjusting of the virtual environment;
   further adjusting the virtual environment based on the tracked changes to reduce reinforcement of the user's emotional state; and
   in a case that reinforcement of the user's emotional state is detected over a predefined period of time, turning off the virtual reality system.

2. The method of claim 1,
   wherein the method further comprises adjusting the user's visual representation based on the user's emotional state.

3. The method of claim 1, wherein the user's physical activity comprises at least one of motions, body functions, a facial expression and a sound generated by the user.

4. The method of claim 1,
   wherein the virtual environment is affected by a gameplay of a video game; and
   wherein adjusting the virtual environment comprises adjusting the gameplay.

5. The method of claim 4,
   wherein the gameplay specifies an appearance of one or more non-player characters (NPCs) of the video game; and
   wherein adjusting the gameplay comprises adapting the appearance of the one or more NPCs based on the user's emotional state.

6. The method of claim 4,
   wherein the gameplay specifies a difficulty level of the video game; and
   wherein adjusting the gameplay comprises adapting the difficulty level of the video game based on the user's emotional state.

7. The method of claim 1, wherein the virtual environment provides an electronic communication between the user and one or more remote users; and wherein adjusting the virtual environment comprises changing options of the electronic communication between the user and the one or more remote users.

8. The method of claim 1, wherein the virtual environment comprises a virtual reality, an augmented reality or a mixed reality.

9. A non-transitory computer-readable storage medium storing computer-readable instructions thereon which, when executed by a processor, cause to processor to carry out the method of claim 1.

10. A system for adjusting a virtual environment of a virtual reality, comprising:

one or more sensors configured to sense a physical activity of a user perceiving a virtual environment in the virtual reality, wherein the one or more sensors are configured to sense at least one of a heart rate, a blood pressure, a pupil size, and sweat of the user; and data processing circuitry configured to:

determine an emotional state of the user based on one or more of the heart rate, the blood pressure, the pupil size, and the sweat of the user;

adjust the virtual environment in the virtual reality based on the user's emotional state, wherein the virtual environment is a setting surrounding a visual representation of the user;

track changes in the user's emotional state in response to the adjusting of the virtual environment;

further adjust the virtual environment based on the tracked changes to reduce reinforcement of the user's emotional state;

adjust the user's visual representation based on the user's emotional state; and in a case that reinforcement of the user's emotional state is detected over a predefined period of time, turn off the virtual reality system.

11. The system of claim 10, wherein the sensors comprise a camera configured to provide one or more images reflecting the physical activity of the user; and wherein the data processing circuitry is configured to determine the emotional state of the user based on the images of the user.

12. A game console configured to generate a virtual environment in a virtual reality, wherein the game console comprises a system of claim 10 for adjusting the virtual environment in the virtual reality using an emotional state of a user perceiving the virtual environment.

13. A method for adjusting a virtual environment of a virtual reality, comprising:

sensing, by one or more sensors, a physical activity of a user perceiving the virtual environment in the virtual reality, wherein sensing the physical activity includes sensing at least one of heart rate, blood pressure, pupil size, and sweat;

determining an emotional state of the user based on one or more of the heart rate, the blood pressure, the pupil size, and the sweat of the user;

adjusting the virtual environment in the virtual reality based on the user's emotional state, wherein the virtual environment is a setting surrounding a visual representation of the user;

tracking changes in the user's emotional state in response to the adjusting of the virtual environment;

detecting a reinforcement of the user's emotional state by tracking the user's emotional state over a predefined period of time; and further adjusting the virtual environment based on the tracked changes to reduce reinforcement of the user's emotional state, wherein the virtual environment is affected by a gameplay of a video game and adjusting the virtual environment comprises adjusting the gameplay, wherein the gameplay specifies an appearance of one or more non-player characters (NPCs) of the video game, wherein adjusting the gameplay comprises adapting the visual appearance characteristics of the one or more NPCs based on the user's emotional state, wherein the visual appearance characteristics include at least one of physical size, color scheme, clothing, or facial features, and wherein the system monitors an influence of each individual NPC on the user's emotional state to specifically adjust the appearance of individual NPCs, including making a first NPC appear more frequently when detected to make the user happy and changing a look of a second NPC to lower its scare effect when detected to frighten the user.

* * * * *